United States Patent
Bandyopadhyay et al.

(10) Patent No.: US 11,544,801 B2
(45) Date of Patent: Jan. 3, 2023

(54) DYNAMIC PRICING OF ENERGY CONSUMED FROM A SHARED BATTERY USING REAL-TIME CONSUMPTION DATA

(71) Applicant: Utopus Insights, Inc., Valhalla, NY (US)

(72) Inventors: Sambaran Bandyopadhyay, Bangalore (IN); Sampath Dechu, Hyderabad (IN); Rama C. Kota, Hyderabad (IN)

(73) Assignee: Utopus Insights, Inc., Valhalla, NY (US)

( * ) Notice: Subject to any disclaimer, the term of this patent is extended or adjusted under 35 U.S.C. 154(b) by 503 days.

(21) Appl. No.: 14/993,426

(22) Filed: Jan. 12, 2016

(65) Prior Publication Data

US 2017/0200239 A1    Jul. 13, 2017

(51) Int. Cl.
G06Q 50/06     (2012.01)
G06Q 30/02     (2012.01)

(52) U.S. Cl.
CPC ......... G06Q 50/06 (2013.01); G06Q 30/0283 (2013.01)

(58) Field of Classification Search
CPC .. G06Q 50/06; G06Q 30/0283; B60L 11/1809
USPC ........................................................ 705/412
See application file for complete search history.

(56) References Cited

U.S. PATENT DOCUMENTS

| | | | | |
|---|---|---|---|---|
| 8,612,362 B2* | 12/2013 | Kumazawa | ............ | G06Q 50/06 |
| | | | | 705/412 |
| 9,558,655 B2* | 1/2017 | Salter | ..................... | G01D 4/002 |
| 2011/0137481 A1 | 6/2011 | Manz et al. | | |
| 2014/0005852 A1* | 1/2014 | Asghari | .................... | G06F 1/26 |
| | | | | 700/297 |
| 2014/0214231 A1 | 1/2014 | Parsonnet et al. | | |
| 2015/0051747 A1 | 2/2015 | Asghari et al. | | |
| 2015/0094968 A1* | 4/2015 | Jia | ......................... | G05B 15/02 |
| | | | | 702/60 |

(Continued)

FOREIGN PATENT DOCUMENTS

WO    WO-2017142536 A1 *    8/2017    ......... G01C 21/3438

OTHER PUBLICATIONS

Zhou, Chengke. "Modeling the cost of EV Battery wear due to V2G Application in Power Systems". https://ieeexplore.ieee.org/stamp/stamp.jsp?arnumber=5958591. Published Dec. 2011. (Year: 2011).*

(Continued)

Primary Examiner — Shannon S Campbell
Assistant Examiner — Lisa Ma
(74) Attorney, Agent, or Firm — Ahmann Kloke LLP

(57) ABSTRACT

Methods, systems, and computer program products for dynamic pricing of energy consumed from a shared battery using real-time consumption data are provided herein. A computer-implemented method includes calculating wear cost arising from a battery shared by multiple users, wherein the wear cost is based on usage data of the battery; calculating a proportionality factor for each of the multiple users for the calculated wear cost, wherein the proportionality factor is based on individual usage of the battery; apportioning the calculated wear cost to each of the multiple users based on the user's proportionality factor; and determining a dynamic price for energy used by the battery for each of the multiple users, based on said apportioning.

4 Claims, 4 Drawing Sheets

(56) References Cited

U.S. PATENT DOCUMENTS

2017/0140482 A1* 5/2017 Salter .................... G08C 19/16

OTHER PUBLICATIONS

Zhu, Ting. "Sharing renewable energy in smart microgrids". 2013 ACM/IEEE International Conference on Cyber-Physical Systems (ICCPS), 2013, pp. 219-228. https://ieeexplore.ieee.org/abstract/document/6604016 (Year: 2013).*

C. Zhou, K. Qian, M. Allan and W. Zhou, "Modeling of the Cost of EV Battery Wear Due to V2G Application in Power Systems," in IEEE Transactions on Energy Conversion, vol. 26, No. 4, pp. 1041-1050, Dec. 2011, doi: 10.1109/TEC.2011.2159977. https://ieeexplore.ieee.org/document/5958591 (Year: 2011).*

Drouilhet et al. A Battery Life Prediction Method for Hybrid Power Applications, AIAA Aerospace Sciences Meeting and Exhibit, 1997.

Rakhmatov et al. An Analytical High-Level Battery Model for Use in Energy Management of Portable Electronic Systems, in Proceedings of the International Conference on Computer Aided Design (ICCAD'01), 2001, pp. 488-493.

* cited by examiner

DYNAMIC PRICING OF ENERGY CONSUMED FROM A SHARED BATTERY USING REAL-TIME CONSUMPTION DATA

FIELD

The present application generally relates to information technology, and, more particularly, to energy management.

BACKGROUND

Batteries are electrochemical devices which convert chemical energy into electrical energy, or vice versa, by means of controlled chemical reactions. Batteries are commonly used, for example, as backup power sources during power outages and also as energy buffers in renewable energy systems. Capital expenditure (CapEx) and operating expenses (OpEx) associated with battery storage can be significant as compared to energy generation cost. Additionally, active chemicals commonly used in storage batteries breakdown gradually and face decreasing lifespans with usage.

Such usage can include multiple users extracting power from a shared deep-cycle battery operating in an off-grid setup. In such a context, the lifespan of the battery chemicals depends on the usage patterns of the battery across the multiple users.

SUMMARY

In one embodiment of the present invention, techniques for dynamic pricing of energy consumed from a shared battery using real-time consumption data are provided. An exemplary computer-implemented method can include calculating wear cost arising from a battery shared by multiple users, wherein the wear cost is based on usage data of the battery; calculating a proportionality factor for each of the multiple users for the calculated wear cost, wherein the proportionality factor is based on individual usage of the battery; apportioning the calculated wear cost to each of the multiple users based on the user's proportionality factor; and determining a dynamic price for energy used by the battery for each of the multiple users, based on the apportioning.

In another embodiment of the present invention, an exemplary computer-implemented method can include calculating wear cost arising from a battery per discharge cycle, wherein the battery is shared by multiple users, and wherein the wear cost is based on (i) usage data of the battery, (ii) one or more operating constraints of the battery, and (iii) one or more battery characteristics derived from specifications of the battery. Such a method can also include calculating a proportionality factor for each of the multiple users for the calculated wear cost, wherein the proportionality factor is based on individual usage of the battery, and apportioning the calculated wear cost to each of the multiple users based on the user's proportionality factor. Further, such a method can additionally include determining a distinct price for energy used by the battery for each of the multiple users, based on said apportioning, and outputting the distinct dynamic price to each of the multiple users.

Another embodiment of the invention or elements thereof can be implemented in the form of an article of manufacture tangibly embodying computer readable instructions which, when implemented, cause a computer to carry out a plurality of method steps, as described herein. Furthermore, another embodiment of the invention or elements thereof can be implemented in the form of an apparatus including a memory and at least one processor that is coupled to the memory and configured to perform noted method steps. Yet further, another embodiment of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

Figure 1:
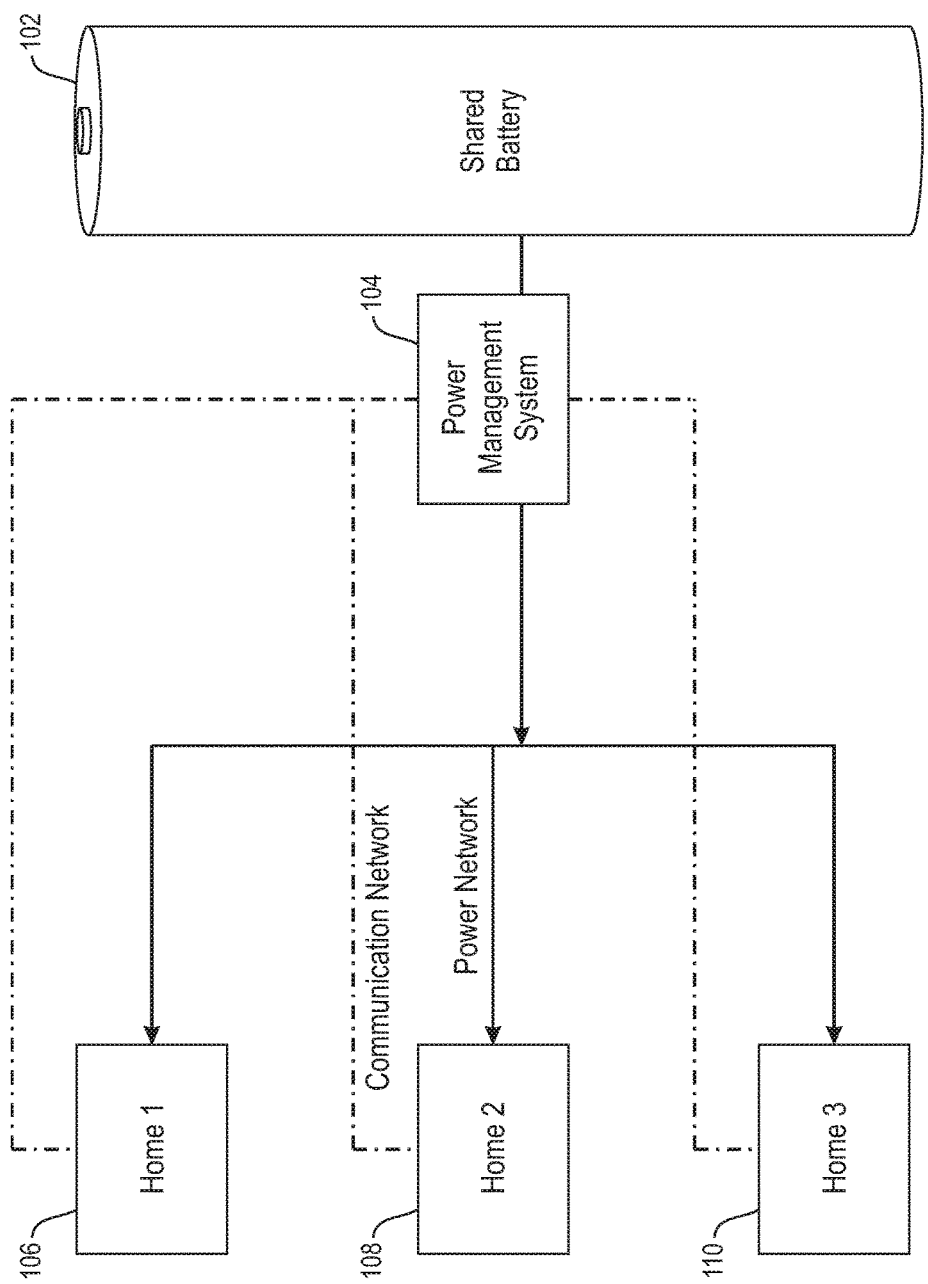
FIG. 1 is a diagram illustrating system architecture, according to an exemplary embodiment of the invention.

As described herein, an embodiment of the present invention includes dynamic pricing of energy consumed from a shared battery using real-time consumption data. At least one embodiment of the invention includes calculating the wear cost of a particular battery per discharge cycle, and apportioning the wear cost across multiple individual users as a dynamic pricing mechanism. As used herein, "wear cost" of a battery refers to an incremental increase in cost per discharge cycle due to deviation from optimal usage of the battery. Calculating the wear cost of a battery per discharge cycle can include, for example, using data provided in product specifications of the battery (such as, for example, a relationship between the depth of discharge and the number of life cycles, a relationship between the discharge rate and the effective energy, etc.) and physical models associated with the battery. Additionally, a battery cost apportionment mechanism, as noted above, can include calculating a user's/customer's contribution to the calculated wear cost of the battery via utilization of data derived from smart meters that measure each user's/customer's energy usage and/or consumption.

Accordingly, at least one embodiment of the invention includes dynamically pricing energy consumed (by a set of multiple users) from a shared battery system using real-time consumption data. Such an embodiment can include identifying physical models for wear cost of the battery as a function of battery usage patterns using data from battery specifications, and calculating the actual wear cost dynamically using real-time supply data of the battery. Additionally, as further detailed herein, such an embodiment can include calculating the proportionality factor for each of the multiple users for the wear cost using individual real-time usage data to apportion the total wear cost of the battery to each user.

Additionally, in one or more embodiments of the invention, historical consumption data can be used to carry out an initial cost apportionment. Also, data can be obtained and/or accessed, for example, from an asset management system, pertaining to relevant battery specifications, and such data can be utilized to model deterioration coefficients associated with the battery. By way of example, one or more best fit functions can be implemented in connection with the data graphs given in the manufacturer specifications.

Further, as noted herein, at least one embodiment of the invention includes using real-time charge discharge data to calculate the wear cost of the particular shared battery for each discharge cycle, as well as calculating wear cost contribution factors associated with each of the multiple users using real-time consumption data of each user. Additionally, such an embodiment can include calculating a price of energy from the shared battery to each of the multiple users using the shared battery. By way of example, in one or more embodiments of the invention, a distinct price may be calculated for each of the multiple users using the shared battery. Moreover, and as further detailed herein, the individual prices calculated for each user can depend, for example, on each user's individual wear cost in each discharge cycle.

By way of illustration, one or more embodiments of the invention can be implemented in example use cases such as mobile battery storage systems (such as, for example, telecommunication hubs, remote monitoring stations, scientific survey systems, remote community systems, and mobile street vendor systems), grid-scale battery storage, and community batteries for distributed generation.

FIG. 1 is a diagram illustrating system architecture, according to an embodiment of the invention. By way of illustration, FIG. 1 depicts a shared battery 102, which feeds to a power management system 104, which ultimately delivers power (through a power network) and information (through a communication network) to various consumers/users such as home 106, home 108, and home 110.

Figure 2:
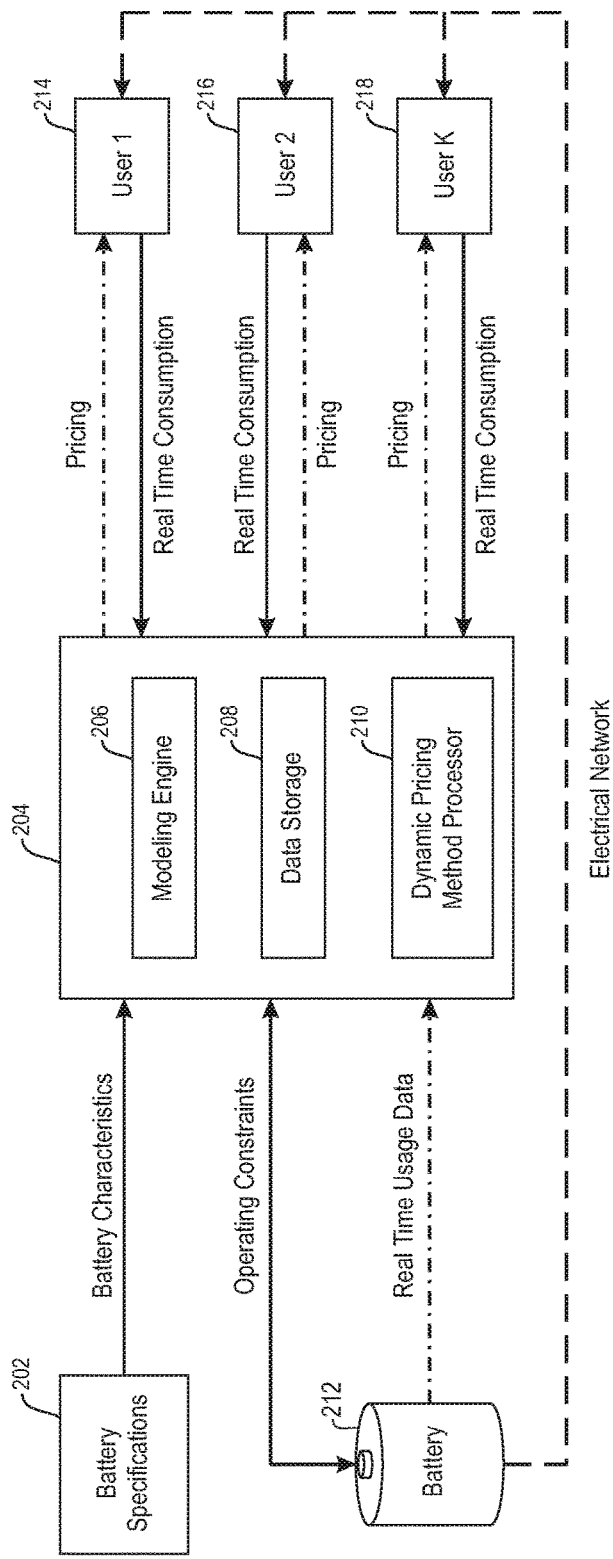
FIG. 2 is a diagram illustrating system architecture, according to an exemplary embodiment of the invention.

FIG. 2 is a diagram illustrating system architecture, according to an exemplary embodiment of the invention. By way of illustration, FIG. 2 depicts a battery specifications component 202, which provides battery characteristics to a dynamic management component 204. The dynamic management component 204 includes a modeling engine 206, a data storage component 208, and a dynamic pricing method processor 210. As also depicted in FIG. 2, the dynamic management component 204 receives input in the form of real-time usage data from a battery 212 that is shared by multiple users (such as user 214, user 216 and user 218) via an electrical network. Further, the dynamic management component 204 receives input in the form of real-time consumption data from the multiple users (214, 216, and 218).

In one or more embodiments of the invention, the modeling engine 206 takes battery specifications (via component 202) given in the manufacturer's specification sheet and uses one or more modeling algorithms (such as a least square regression fit) to derive one or more functions to calculate various wear cost factors. Additionally, the data storage component 208 can store the real-time consumption data of each customer/user in a database, as well as store modeling functions derived by the modeling engine 206. The dynamic pricing method processor 210 can access the models and real-time consumption data from the data storage component 208, execute techniques such as detailed in connection with one or more embodiments of the invention, and derive a price per unit of energy for each consumer/user. The dynamic pricing method processor 210 can also support visualization of such data for administrative purposes.

Based on the real-time power consumption of the individual users from the shared battery, the shared battery characteristics, and the real-time supply/usage data, the dynamic management component 204 outputs a user-specific energy cost (pricing) to each of the multiple users (214, 216, and 218). As also depicted in FIG. 2, the dynamic management component 204 additionally outputs operating constraints to the battery 212. Such constraints can include, for example, operating constraints for the battery to be operated within specified safety limits, wherein such limits can be specified in the battery specification information in connection with the real-time demand from consumers/users.

As used herein, various variables pertaining to battery specification data are defined as follows:
rated capacity (of a battery)=$C_R$;
rated depth of discharge (DoD) (associated with a battery) =$D_R$;
rated life cycle (for a battery) at $D_R$=$L_R$;
a function for calculating DoD cost factor as a function of actual DoD ($D_A$)=$\rho_d(D_A)$;
rated discharge time (of a battery)=$T_R$;
Peukart's exponent=k; and
a function for calculating a discharge rate cost factor as a function of the actual discharge current ($I_A$)=$\rho_d(I_A)$.

Additionally, as used herein, various variables pertaining to system and battery usage data are defined as follows:
battery cost=B;
system voltage=$V_A$;
energy cost for a current discharge cycle=$W_C$; and
real-time battery usage data=(P, t).

Further, as used herein, various variables pertaining to customer/user requirements and real-time usage data are defined as follows:
peak energy requirements of a consumer/user (i)=$E_i$; and
real-time power consumption data for a consumer/user (i)=(p, t).

Accordingly, one or more embodiments of the invention can include implementing the following steps:

Step 1: calculating the CapEx cost of energy for a current discharge cycle via $$W_C = \frac{B}{L_R}.$$

Step 2: calculating equivalent battery capacities of each consumer/user via $C_i = E_i/D_R$.

Step 3: calculating CapEx for each consumer/user via $$W_i = \frac{1}{L_R} * \frac{B}{C_R} * C_i.$$

Step 4: calculating the average discharge rate of each consumer/user via $$I_{Ai} = \frac{\text{mean}(p_i)}{V_A}.$$

Step 5: calculating the average discharge current delivered from the battery via $$I_A = \frac{\text{mean}(P)}{V_A}.$$

Step 6: calculating the energy consumed by each consumer/user via $e_i = \Sigma_t(p_i * t)$.

Step 7: calculating the energy supplied by the battery via $e = \Sigma_t(P * t)$.

Step 8: calculating an equivalent DoD of a consumer/user via $$D_{Ai} = \frac{e_i}{C_i}.$$

Step 9: calculating the DoD of the battery in a current discharge cycle via $$D_A = \frac{e}{C_R}.$$

Step 10: calculating the effective energy consumption of each consumer/user via $e_i' = e_i * \rho_r(I_{Ai})$.

Step 11: calculating the effective CapEx cost for each consumer/user via $w_i' = w_i * \rho_d(D_{Ai})$.

Step 12: calculating the cost of energy for each consumer/user for a current discharge cycle via $$p_i = W_c * \rho_r(I_A) * \frac{e_i'}{\Sigma_i e_i'} + W_c * \rho_d(D_A) * \frac{w_i'}{\Sigma_i w_i'}.$$

Accordingly, as noted herein, models for the dependency of effective capacity on discharge rate and the number of discharge cycles on DoD can be derived from specification data of the battery.

Figure 3:
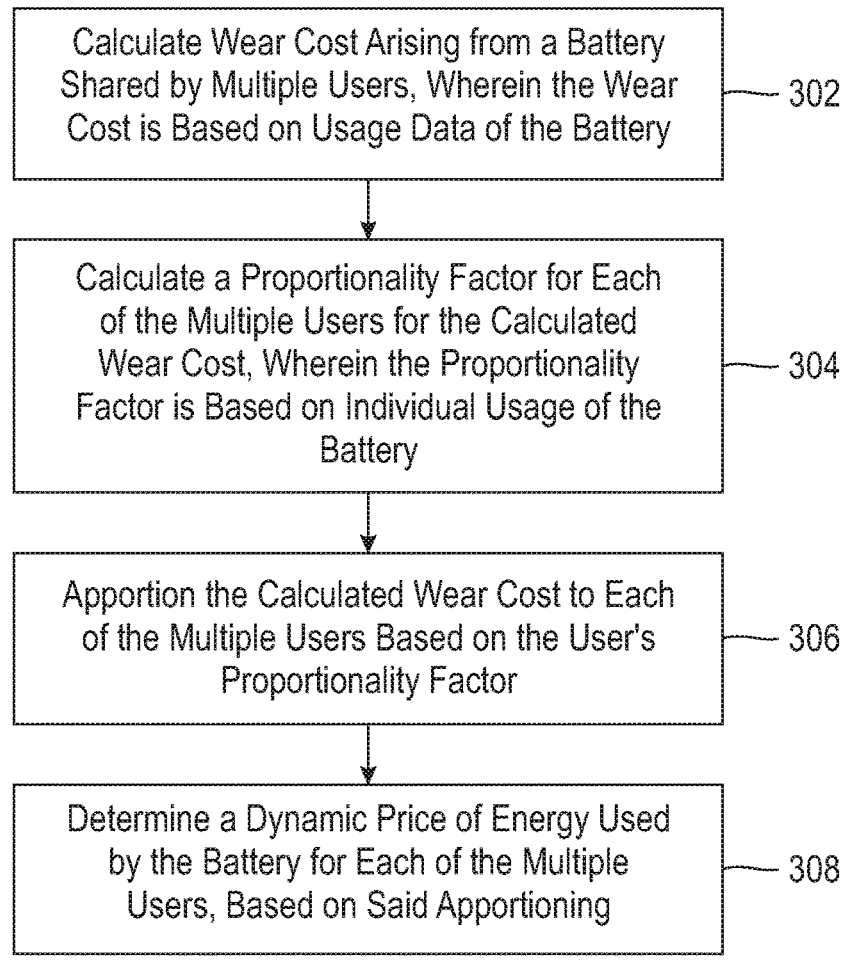
FIG. 3 is a flow diagram illustrating techniques according to an embodiment of the invention.

FIG. 3 is a flow diagram illustrating techniques according to an embodiment of the present invention. Step 302 includes calculating wear cost arising from a battery shared by multiple users, wherein the wear cost is based on usage data of the battery. Step 304 includes calculating a proportionality factor for each of the multiple users for the calculated wear cost, wherein the proportionality factor is based on individual usage of the battery.

Step 306 includes apportioning the calculated wear cost to each of the multiple users based on the user's proportionality factor. Step 308 includes determining a dynamic price for energy used by the battery for each of the multiple users, based on said apportioning. In at least one embodiment of the invention, the dynamic price can include a distinct price for each of the multiple users.

The techniques depicted in FIG. 3 can also include determining one or more physical models for calculating the wear cost as a function of one or more battery usage patterns. Further, the techniques depicted in FIG. 3 can include recording real-time energy consumption, from the battery, attributed to each of the multiple users. Such recording can include employing one or more smart meters configured to measure current, power, and/or energy consumption of the battery attributed to each of the multiple users.

Additionally, the techniques depicted in FIG. 3 can include recording a real-time energy supply level of the battery, wherein recording can include, for example, employing one or more smart meters configured to measure depth of discharge, current, power and/or energy level of the battery. Also, one or more embodiments of the invention can include outputting the determined dynamic price to each of the multiple users, wherein outputting can include, for example, displaying the determined dynamic price on a meter display.

At least one additional embodiment of the invention can include calculating wear cost arising from a battery per discharge cycle, wherein the battery is shared by multiple users, and wherein the wear cost is based on (i) usage data of the battery, (ii) one or more operating constraints of the battery, and (iii) one or more battery characteristics derived from specifications of the battery. Such an embodiment can also include calculating a proportionality factor for each of the multiple users for the calculated wear cost, wherein the proportionality factor is based on individual usage of the battery, and apportioning the calculated wear cost to each of the multiple users based on the user's proportionality factor. Further, such an embodiment can additionally include determining a distinct price for energy used by the battery for each of the multiple users, based on said apportioning, and outputting the distinct dynamic price to each of the multiple users.

Also, in such an embodiment of the invention, the one or more battery characteristics can include a relationship between depth of discharge of the battery and the number of life cycles of the battery. The one or more battery characteristics comprise a predefined optimal usage of the battery. Additionally, in such an embodiment of the invention, the one or more operating constraints comprise one or more predefined safety limits and/or a demand level of the multiple users.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 4:
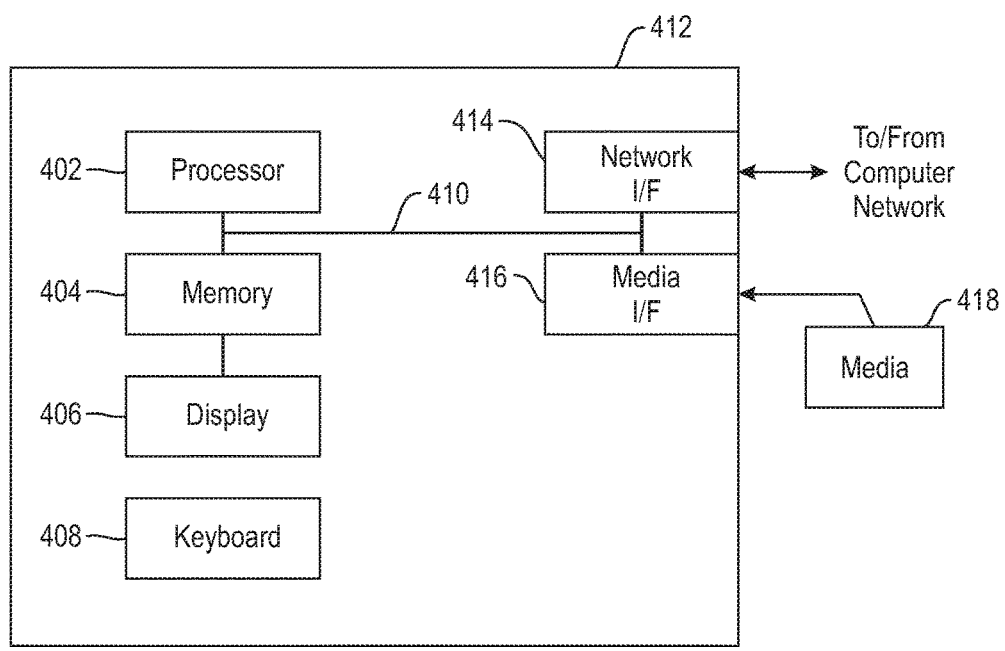
FIG. 4 is a system diagram of an exemplary computer system on which at least one embodiment of the invention can be implemented.

Additionally, an embodiment of the present invention can make use of software running on a computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, implementing a dynamic pricing mechanism for energy consumed from a shared battery system, apportioning battery wear-cost based on the usage patterns, and calculating the price of energy for each relevant customer.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
a shared battery, the shared battery being shared by two or more homes across an electrical network, the electrical network providing electrical power from the shared battery and electrical power from an electrical grid to the two or more homes;
a smart meter configured to:
measure current, power, and/or energy consumption of the shared battery;
record a real-time energy supply level of the shared battery;
measure depth of discharge, current, power and/or energy level of the shared battery;
one or more processors; and
memory storing instructions that, when executed by the one or more processors, cause the system to perform:
determining a shared battery wear cost arising from the shared battery providing power across the electrical network to the two or more homes, the electrical network providing electrical power from the shared battery and electrical power from an electrical grid to the two or more homes, the shared battery wear cost being based on a shared battery cost over a rated life cycle of the shared battery;
receiving a depth of discharge of the shared battery; and for each of the two or more homes:
  receiving, from a smart meter of that particular home real-time energy information for energy consumed by the particular home of the two or more homes over a period of time;
  determining an equivalent shared battery capacity for the particular home based on a peak energy requirement of particular home across the depth of discharge of the shared battery;
  determining a home depth of discharge for the particular home based on the real-time energy information for energy consumed by the particular home over the period of time and the equivalent shared battery capacity for the particular home;
  determining an effective energy consumption for the particular home in real-time based on the real-time energy consumed by the particular home over the period of time and a discharge cost factor;
  determining an effective wear cost for the particular home based on home wear cost for the particular home and a discharge rate cost factor;
  determining, at least in part by the smart meter, a dynamic resource consumption for energy used by the shared battery for the particular home based on an energy charge for a current discharge cycle in real-time, a discharge cost for the current discharge cycle in real-time, and the shared battery wear cost; and
  outputting, in real-time, the dynamic resource consumption for energy used by the shared battery for each of the two or more homes, thereby apportioning the shared battery wear cost across the two or more homes sharing the shared battery, the outputting comprises causing a display of the dynamic resource consumption on each meter display.

2. The system of claim 1, wherein the instructions, when executed by the one or more processors, further cause the system to perform: determining one or more physical models for calculating the wear cost as a function of one or more shared battery usage patterns.

3. The system of claim 1, wherein the instructions, when executed by the one or more processors, further cause the system to perform: recording real-time energy consumption, from the shared battery, attributed to each of the two or more homes.

4. The system of claim 1, wherein the dynamic resource consumption comprises a distinct price for each of the two or more homes.

* * * * *